United States Patent
Bock et al.

(10) Patent No.: US 12,315,940 B2
(45) Date of Patent: May 27, 2025

(54) GAS DIFFUSION LAYER FOR FUEL CELLS

(71) Applicant: CARL FREUDENBERG KG, Weinheim (DE)

(72) Inventors: Achim Bock, Weinheim (DE); Kristof Klein, Weinheim (DE); Christoph Rakousky, Ober-Ramstadt (DE); Hannes Barsch, Heidelberg (DE)

(73) Assignee: CARL FREUDENBERG KG, Weinheim (DE)

( * ) Notice: Subject to any disclaimer, the term of this patent is extended or adjusted under 35 U.S.C. 154(b) by 436 days.

(21) Appl. No.: 17/776,235

(22) PCT Filed: Nov. 5, 2020

(86) PCT No.: PCT/EP2020/081095
§ 371 (c)(1),
(2) Date: May 12, 2022

(87) PCT Pub. No.: WO2021/099129
PCT Pub. Date: May 27, 2021

(65) Prior Publication Data
US 2022/0393184 A1 Dec. 8, 2022

(30) Foreign Application Priority Data
Nov. 20, 2019 (DE) .................. 10 2019 131 343.0

(51) Int. Cl.
*H01M 4/88* (2006.01)

(52) U.S. Cl.
CPC ............................. *H01M 4/8807* (2013.01)

(58) Field of Classification Search
CPC ............ H01M 4/8807; H01M 8/0234; H01M 8/0245; Y02E 60/50
See application file for complete search history.

(56) References Cited

U.S. PATENT DOCUMENTS

| | | | |
|---|---|---|---|
| 6,605,381 | B1 | 8/2003 | Rosenmayer |
| 9,692,070 | B2 | 6/2017 | Lee et al. |
| 2007/0238010 | A1 | 10/2007 | Zhang |
| 2008/0075940 | A1 | 3/2008 | Schafer |
| 2009/0061710 | A1 | 3/2009 | Helmbold |
| 2010/0255407 | A1 | 10/2010 | Kim |
| 2011/0318661 | A1 | 12/2011 | Uensal |
| 2014/0272664 | A1 | 9/2014 | Lu |
| 2017/0025690 | A1 | 1/2017 | Andreas-Schott |

FOREIGN PATENT DOCUMENTS

| | | |
|---|---|---|
| CN | 1367941 A | 9/2002 |
| CN | 104051749 A | 9/2014 |
| CN | 110112425 A | 8/2019 |
| DE | 102005022484 A1 | 11/2006 |
| EP | 1114475 A2 | 7/2001 |
| EP | 2228857 A1 | 9/2010 |
| JP | 2006120506 A | 5/2006 |

(Continued)

*Primary Examiner* — Victoria H Lynch
(74) *Attorney, Agent, or Firm* — LEYDIG, VOIT & MAYER, LTD.

(57) ABSTRACT

A gas diffusion layer for a fuel cell includes: a) a flat, electrically conductive fiber material; and b) a microporous layer on one surface of the fiber material. The gas diffusion layer has, with respect to a base area thereof (in an xy plane), at least one property gradient relating to at least one chemical and/or physical property.

19 Claims, 1 Drawing Sheet

(56) References Cited

FOREIGN PATENT DOCUMENTS

| | | | |
|---|---|---|---|
| JP | 2007323874 | A | 12/2007 |
| JP | 2009532848 | A | 9/2009 |
| JP | 2009238376 | A | 10/2009 |
| JP | 2009245871 | A | 10/2009 |
| JP | 2016015216 | A | 1/2016 |
| WO | WO 02/31841 | A2 | 4/2002 |
| WO | WO 2011100602 | A1 | 8/2011 |
| WO | WO 2015150533 | A1 | 10/2015 |

GAS DIFFUSION LAYER FOR FUEL CELLS

CROSS-REFERENCE TO PRIOR APPLICATIONS

This application is a U.S. National Phase application under 35 U.S.C. § 371 of International Application No. PCT/EP2020/081095, filed on Nov. 5, 2020, and claims benefit to German Patent Application No. DE 10 2019 131 343.0, filed on Nov. 20, 2019. The International Application was published in German on May 27, 2021 as WO 2021/099129 under PCT Article 21(2).

FIELD

The present invention relates to a gas diffusion layer for fuel cells, fuel cells containing the latter, and the use of such a gas diffusion layer.

BACKGROUND

Fuel cells use the chemical reaction of a fuel, in particular hydrogen, with oxygen to water to generate electrical energy. In hydrogen-oxygen fuel cells, hydrogen or a hydrogen-containing gas mixture is fed to the anode, where an electrochemical oxidation occurs while electrons are released ($H_2 \rightarrow 2H^+ + 2e^-$). The protons are transported from the anode space into the cathode space through a membrane, which separates the reaction spaces in a gas-tight manner and electrically insulates them. The electrons provided at the anode are conducted to the cathode via an external conductor circuit. Oxygen or an oxygen-containing gas mixture is fed to the cathode, wherein the oxygen is reduced while it receives the electrons. The oxygen anions thus formed react with protons transported through the membrane, thus forming water ($\frac{1}{2}O_2 + 2H^+ + 2e^- \rightarrow H_2O$).

For many applications, especially in the automotive drive train, low-temperature proton exchange membrane fuel cells (PEMFC, also called polymer electrolyte membrane fuel cells) are used, achieving efficiencies of up to 60%. The heart of the PEMFC is a polymer electrolyte membrane (PEM) which is permeable only to protons (or oxonium ions $H_3O^+$) and water, and which spatially separates the oxidation agent, generally the air's oxygen, from the reduction agent. To ensure the best possible proton transport through the membrane, humidified membranes are usually employed. A catalyst layer is applied to the gas-tight, electrically-insulating, proton-conducting membrane on the anode and cathode sides, forming the electrodes and usually containing platinum as the catalytically active metal. The actual redox reactions and charge separations occur in the catalytic layers. Particular requirements apply to them since they have to be conductive for both electrons and protons and, in addition, they have to enable the supply of the reaction gases and the discharge of the water formed by the cathode reaction. The membrane and the catalytic layers form a unit, also referred to as a CCM (catalyst coated membrane). A gas diffusion layer (GDL) is provided on both sides of the CCM, which stabilizes the cell structure and performs transport and distribution functions for the reaction gases, water, heat and current. The membrane, electrodes and gas diffusion layer form the membrane-electrode assembly (MEA).

An alternative to the CCM is the gas diffusion electrode (GDE), wherein the electrode material is not applied to the membrane, but to the GDL. EP 2228857 A1 describes a membrane-electrode assembly for high-temperature fuel cells, comprising a gas diffusion electrode including at least two gas diffusion layers containing polytetrafluoroethylene, wherein the gas diffusion layers have different polytetrafluoroethylene concentrations. The GDE thus has a PTFE concentration gradient in the transport direction of the operating media, i. e., regarding its thickness, or perpendicular to the base area (i. e., in the z axis direction).

In individual cells only having a single membrane electrode assembly, a flow distribution plate is arranged on each side of the MEA, including channels for feeding the process gases to the electrodes, and usually additional interior cooling channels for dissipating the heat. However, fuel cells are usually not made up of individual cells but of a plurality of membrane-electrode assemblies arranged in a stack connected in series and having their electrical power added. Only one flow distribution plate (a so-called bipolar plate) is usually arranged between two membrane-electrode assemblies. This bipolar plate is structured on its front and back sides and has channels for feeding process gases to the cathode adjacent on the one side and to the anode adjacent on the other side, as well as usually additional interior cooling channels. The flow distribution plates, or bipolar plates, are of an electrically conductive material to establish the electrical connection between the stacked membrane-electrode assemblies.

The main function of the flow distribution plates is to uniformly supply the MEA with reaction gases and to discharge the reaction products, i. e., the water produced by the cathode reaction in the hydrogen-oxygen fuel cell. For this purpose, the flow distribution plates have a unilaterally open channel structure between the inlet and the outlet, the so-called flow field. The flow field serves for the macroscopic distribution of the reaction gases to the adjacent GDL, which performs the microscopic distribution to the catalytically active regions of the membrane. The flow field further performs the removal of the gaseous and liquid product water. The flow field is formed by webs and channels, the arrangement of which forms a characteristic design. Common web widths and channel widths are each in the range of about 0.2 mm to 1.5 mm. Currently, four flow field designs are primarily used in PEMFCs: parallel flow field with straight channels, serpentine flow field, interdigital flow field with discontinuous channels and the pin-type flow field. When the flow field is designed, in addition to the process gas supply, a continuous condensate removal is an important criterion. The convective transport of matter is dominant within the flow field due to the pressure differential between the inlet and the outlet of the flow field. The anode and the cathode differ in their requirements regarding the supply of process gases and the discharge of the reaction products. On the side of the anode, the supplied hydrogen is essentially converted to protons migrating to the cathode through the membrane. While no process water is produced in the anode reaction, water can pass from the cathode to the anode through the membrane. On the side of the cathode, significant amounts of water are produced by the reduction reaction, which must be discharged through the channel structure of the flow distribution plates. The flow distribution plates for the cathode and the anode, or rather the two sides of a bipolar plate, thus usually have different flow field designs.

Gas diffusion layers are usually present between each of the flow distribution plates, or bipolar plates, and the catalytic layers, which are of essential importance for the functioning and the performance of the fuel cell:

All process components consumed and produced in the electrode reactions must be transported through the gas diffusion layer and homogeneously distributed by the macroscopic structure of the flow distribution plates/bipolar plates to the microscopic structure of the catalytic layers. Among other things, this includes the transport of hydrogen to the anode and of oxygen to the cathode and of gaseous and liquid water from the anode into the flow channels of the flow distribution plates/bipolar plates. On the one hand, the gas transport must not be obstructed by excessive flooding of the pores, on the other hand, the MEA must not dry out.

The electrons produced and consumed in the half-cell reactions must be conducted to the flow distribution plates with the lowest possible voltage loss. This is achieved by using highly conductive materials.

The heat produced during the reaction must be dissipated by the coolant within the flow distribution plates, which is why the materials of the GDL also have to have sufficient thermal conductivity.

Moreover, the GDL must also act as a mechanical compensation between the macro-structured flow distribution plate and the catalytic layers. In addition, the component tolerances must be compensated and the compressive pressure must be distributed. It also has the function of mechanically protecting the extremely thin membranes exposed to high loads in the fuel cells.

Due to the required properties, GDLs are usually made of a carbon fiber substrate, which is usually hydrophobically finished with fluorine-polymers (e. g. PTFE). To optimize the transport properties of gas and liquid water, the GDLs are generally coated with a microporous layer (MPL) over their entire surface. The MPL is usually made of a fluorine-containing polymer as a binder (e. g. PTFE) and a porous and electrically conductive carbon material (e. g. carbon black or graphite powder). While the pores in the fiber substrate of the GDL usually have diameters in the range of 10 to 30 μm, the pore diameters in the MPL are usually in the range of 0.05 to 1 μm. Since the pore size of the electrode is in the range of 10 to 100 nm, a transition from the macroscopic pores of the substrate to the microscopic pores of the electrode is created by the MPL. The three following materials are currently used as the carbon substrates for the GDL:
  carbon fabric: e. g., yarns of oxidized, but not yet carbonized polyacrylonitrile fibers are used for manufacture, which are carbonized or graphitized after weaving.
  carbon fiber papers: e. g. PAN fibers are carbonized for manufacture, broken into fiber fragments, dissolved and, in analogy to paper making, a fiber laying is produced by screening (vat). Binders, e. g. phenolic resins, are used to stabilize the paper.
  carbon fiber nonwoven fabrics: to produce them, dried, carded and water-jet consolidated nonwoven fabrics of an oxidized polyacrylonitrile can be used, which are subsequently thickness calibrated and carbonized. A conductive nonwoven fabric material and its manufacture are described, for example, in WO 02/31841 A2.

The GDLs known from the state of the art consist of layers and partial structures that are as homogeneous as possible. Hitherto, neither the fiber structures nor the hydrophobic finish, or the MPL coating, have any specifically produced property gradients.

A problem in the operation of fuel cells continues to be that there are great differences regarding the chemical composition of the flowing operating media (oxygen content, hydrogen content, overall water content) and the operating parameters (temperature, pressure, content of gaseous and liquid water) between the inflow of the process gases to the flow field of the flow distribution plate and the outflow of the reaction products from the flow field. Many of these parameters have a gradient both with respect to the precise flow development predefined by the flow field design, and with respect to the direct connection between the inflow and the outflow of the operating media. These gradients continue in the GDL all the way to the electrodes. They have a great influence over the performance of the fuel cell, since they result in a gradient of the current density distribution between the inlet and outlet of each electrode. Herein, the gradients on the cathode side (air side) of a fuel cell are particularly performance-defining, while gradients can also arise on the anode side in the hydrogen distribution as well as a transport of water through the membrane and the gradient formation associated therewith. This gradient formation will be explained in the following for the situation arising at the cathode:

Cathode Inlet:
  $O_2$ concentration=maximum
  $O_2$ pressure=maximum
  temperature=minimum
  gas moisture=minimum
  cumulative amount of liquid water=minimum Cathode Outlet:
  $O_2$ concentration=minimum
  $O_2$ pressure=minimum
  temperature=maximum
  gas moisture=maximum
  cumulative amount of liquid water=maximum Attempts have already been made to reduce the formation of such gradients during the operation of the fuel cell. One approach is associated with the design of the flow distribution plates/bipolar plates. Attempts have been made to minimize gradient formation by the design of the flow field (e. g. crossflow vs. counterflow of the anode and cathode gases).

WO 2015150533 describes a bipolar plate for fuel cells having their hydraulic cross-section optimized such that the pressure loss of the operating media is reduced and a pressure distribution of the operating media that is as homogeneous as possible is realized across the surface area. For this purpose, a bipolar plate is used that is subdivided into three regions, comprising two distributor regions and an active region. A first distributor region provides the supply of the operating media to the active region of the bipolar plate, a second distributor region provides for the discharge of the operating media from the active region. Moreover, the bipolar plate has channels, which connect the operating media main ports of the distributor regions with each other. Further, the distributor regions have at least one overlapping section, in which the channels overlap each other in a non-fluidically connecting manner. The cathode gas main port is arranged in such a manner that cathode channels extending therefrom extend along a straight line over at least the distributor region of the fuel cell, and in that, in a first overlapping section, anode channels extending from the anode gas main port and the cathode channels overlap each other and define an angle greater than 0° and smaller than 90°. The fuel cells described in WO2015150533 also leave room for improvement regarding their properties.

DE 10 2005 022 484 A1 describes a gas diffusion layer including at least two functional regions effectively connected to each other, wherein the first region has a porous structure and the second region is formed as a stabilizing zone. It generally describes, without supporting this by an exemplary embodiment, that the GDL can have a progressive structure, e. g., in the form of a gradient. For example, the GDL can consist of a unitary material, which regarding its bending strength, its tensile modulus or other mechanical properties not more closely specified, is characterized by gradients in various spatial directions. In this document, in particular, it is not described that the GDL is coated with an MPL, which has a continuous or discontinuous property gradient in the xy plane, and that this gradient monotonically varies as a function of its location (i. e., always increases or always decreases, while it can also remain constant in partial ranges, but is without local minima or maxima).

US 2010/0255407 A1 describes an electrode for a fuel cell, comprising a gas diffusion layer, a catalytic layer and a hydrophobic material at the interface between the gas diffusion layer and the catalytic layer. In particular, it is a specific embodiment of a PEM fuel cell comprising an electrolyte membrane impregnated with phosphoric acid. The hydrophobic material is intended to prevent the phosphoric acid from blocking a uniform oxygen flow into the catalytic layer. It has a continuous concentration gradient in a first direction extending away from the gas diffusion layer (i. e., in the z direction) and a discontinuous concentration gradient in a second direction perpendicular to the first direction (i. e., in the xy plane). The hydrophobic material between the GDL and the catalytic layer is an essential feature of the described electrode, whereby it does not correspond to the MPL, which can be additionally provided. Moreover, it is of critical importance that the hydrophobic material has a discontinuous gradient in the direction of the surface at the interface between the GDL and the catalytic layer. For this purpose, the hydrophobic material can be arranged in a point-wise fashion on the GDL, the points having a radial concentration gradient in the direction of the surface. Again, this document does not describe coating of a GDL with an MPL having a continuous or discontinuous, monotonic property gradient in the xy plane.

CN 110112425 describes a PEM fuel cell comprising a gas diffusion layer, comprising a hydrophobing of the fiber material along the flow channels having a gradient in the main gas flow direction between the inlet and the outlet. PTFE is preferably used to achieve hydrophobing. To do this, the fiber material itself is hydrophobed. This document does not describe the use of a GDL, which has an MPL as an additional layer, which has a monotonic property gradient in the xy plane.

SUMMARY

In an embodiment, the present invention provides a gas diffusion layer for a fuel cell, comprising: a) a flat, electrically conductive fiber material; and b) a microporous layer on one surface of the fiber material, wherein the gas diffusion layer has, with respect to a base area thereof (in an xy plane), at least one property gradient relating to at least one chemical and/or physical property.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows 3 alternative stamping positions (GDL 1 to 3). The GDLs thus obtained have a property gradient in the direction of the x axis, wherein GDL 1 has four strips each having different properties, and GDL 2 and 3 each have three strips having different properties.

DETAILED DESCRIPTION

Figure 1:
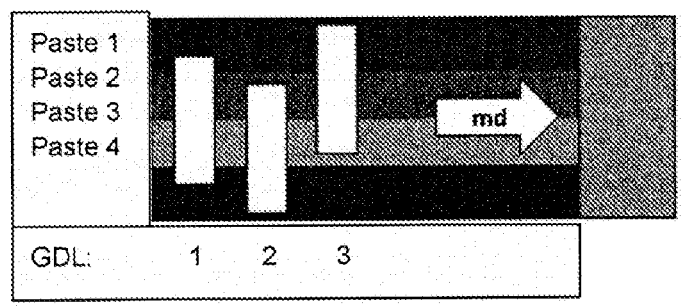
FIG. 1 shows a plan view of a GDL material, the manufacture of which is described in example 1. On a fiber nonwoven fabric in A3 format (29.7×42 cm, where md is the machine direction) 4 laterally adjacent strips having 4 different MPL pastes (pastes 1 to 4) were longitudinally applied in a width of at least 7 to 8 cm. From the dried and sintered material, gas diffusion layers in the format 274.8×96.5 mm having a long side transverse to the machine direction, where stamped out.

In an embodiment, the present invention provides PEM fuel cells which are improved in view of the above-described complex property profile. In an embodiment, the present invention reduces, or avoids, the drawbacks resulting from the gradients regarding the chemical composition and/or the operating parameters between the inlet and the outlet of the operating media. Especially, the fuel cells thus provided should have the least possible variations of the current density across the active surface area.

In an embodiment, the present invention provides a gas diffusion layer for fuel cells which, in turn, has at least one property gradient by which the distribution of the operating media is improved by the GDL. By specifically adapting the GDL properties to the gradients of the operating media as they are provided by the ambient conditions of the half-cell reactions, the performance of the fuel cell can be significantly improved. In particular, the variations in current density can be reduced across the active surface area.

A first subject matter of the invention is a gas diffusion layer for a fuel cell, comprising:
  a) a flat, electrically conductive fiber material, and
  b) a microporous layer on one of the surfaces of the fiber material,
  wherein the gas diffusion layer has, with respect to its base area (in the xy plane), at least one property gradient relating to at least one chemical and/or physical property.

In a preferred embodiment, at least the microporous layer includes at least one property gradient.

A further subject matter of the present invention is a method for producing a gas diffusion layer for a fuel cell, comprising a flat fiber material a) and a microporous layer b) on one of the surfaces of the fiber material, wherein the microporous layer, with respect to the base area (in the xy plane) of the gas diffusion layer, includes at least one property gradient relating to at least one chemical and/or physical property, including
  i) providing a flat, electrically conductive fiber material a),
  ii) coating the fiber material provided in step i) with a precursor for forming a microporous layer, wherein the composition of the precursor is varied during coating to produce a gradient,
  iii) thermally post-processing the coated fiber material obtained in step ii).

A further subject matter of the present invention is a fuel cell comprising at least one gas diffusion layer, as defined above and in the following.

A further subject matter of the present invention is the use of a gas diffusion layer, as defined above and in the following, for the production of fuel cells having reduced variations in the current density across the electrode surfaces, especially on the side of the cathode.

The fuel cells according to the present invention have the following advantages:

Due to the at least one property gradient, which the gas diffusion layers according to the present invention have, the properties of the GDL can be specifically adapted to the operating conditions of each fuel half-cell. The GDL has improved properties regarding the distribution of the operating media. In particular, it is possible to control the various transport processes through the GDL independently of one another. For example, the transport of liquid water and of gaseous water can be separately adjusted. The oxygen transport through the GDL to the cathode can also be specifically controlled.

The gas diffusion layers according to the invention can be simply and cost-effectively produced.

By using the gas diffusion layers according to the invention, variations in current density across the active surface area can be reduced in the resulting fuel cells.

Gas Diffusion Layer (GDL)

The GDL used in accordance with the present invention is a flat sheet object having an essentially two-dimensional, planar extension and a small thickness relative thereto. The gas diffusion layer according to the invention has a base area usually essentially corresponding to the base area of the adjacent membrane comprising the catalytic layers and to the base area of the adjacent flow distribution plate. The shape of the base area of the gas diffusion layer can be, for example, polygonal (n-sided, with n≥3, e. g. triangular, rectangular, pentagonal, hexagonal, etc.), circular, circular segment-shaped (e. g., semicircular), ellipsoid or elliptic segment-shaped. Preferably, the base area is rectangular or circular. In the context of the invention, a cartesian coordinate system is used to describe the GDL, wherein the base area of the GDL extends in the plane defined by the x axis and the y axis (also referred to as the xy plane). The z axis orthogonal thereto serves to describe the material thickness. In accordance with the usual description of fiber composite materials, the x axis is also described as the machine direction (MD) and the y axis is described as the cross-machine direction (CMD). The material transport between the flow distribution plate and the membrane is usually in the direction of the z axis.

According to the present invention, the gas diffusion layer comprises at least one property gradient with respect to at least one chemical and/or physical property. That is, that at least one property of the gas diffusion layer is dependent on its location. The property gradient can extend along one, two or all three spatial directions. It can extend over the full longitudinal extension in one spatial direction, or over a certain section thereof. The property variation can be discontinuous (i. e., the gas diffusion layer according to the invention has a heterogeneity with respect to at least one property) or continuous (i. e., the gas diffusion layer according to the invention has an inhomogeneity with respect to a to least one property). A discontinuous property variation usually has at least 2, preferably at least 3, in particular, at least 4 steps regarding the property comprising the gradient.

Either the flat fiber material a) or the microporous layer b), and also both of them, can have the at least one property gradient.

Preferably, the at least one microporous layer has at least one property gradient. Preferably, at least the cathode-side gas diffusion layers of the fuel cell according to the invention have an MPL, which has a property gradient with respect to the base area (in the xy plane) of the GDL. It has been found that by using an MPL comprising a property gradient with respect to the base layer (in the xy plane) of the GDL, a more uniform current density distribution of the fuel cell can be achieved. In a special embodiment, exclusively the microporous layer has one or more property gradients.

Preferably, the gas diffusion layer (i. e. the flat fiber material a) and/or the microporous layer b)) has at least one property gradient monotonically varying as a function of its location. A monotonic property variation is understood to mean that the value of the function representing the property variation either always increases or always decreases when the value of the location coordinate increases. The value of the function representing the property variation, is allowed to remain equal in the development of the location coordinate also across a partial area or across several partial areas. However, it does not have any local minima or maxima.

Preferably, the gas diffusion layer (i. e., only the flat fiber material a) or only the microporous layer b) or both the flat fiber material a) and the microporous layer b)) only have property gradients monotonically varying as a function of their location.

Preferably at least the microporous layer b) has at least one property gradient varying as a function of its location. In a special embodiment, the microporous layer exclusively has at least one property gradient monotonically varying as a function of its location. In a further special embodiment, the microporous layer exclusively has property gradients monotonically varying as a function of their location. More specifically, the microporous layer has only one property gradient, and this one property gradient varies as a function of its location.

The gas diffusion layer, as a component a), comprises at least one electrically conductive flat fiber material. Preferably, the component a) comprises a fiber material which is selected from nonwoven fabrics, papers, fabrics and combinations thereof. Suitable substrate materials are fiber materials which are conductive themselves or have been made conductive by the addition of conductive additives, such as carbon or metal particles. In principle, carbon fibers, glass fibers, fibers of organic polymers, such as polypropylene, polyester, polyphenylene sulfide, polyetherketones and mixtures thereof are suitable as a substrate material. The fibers contained in the fiber material a) preferably comprise or consist of carbon fibers. Such fiber materials particularly advantageously fulfil the requirements of the GDL with regard to gas diffusiveness, liquid water permeability, electrical and thermal conductivity.

The production of the carbon fibers can be performed in the usual manner, wherein polyacrylonitrile fibers (PAN fibers) are preferably utilized as the starting material. PAN fibers are made by radical polymerization of a monomer composition preferably including at least 90 wt % acrylonitrile in relation to the overall weight of the monomers used for polymerization. The polymer solution thus obtained is spun to filaments and combined in ropes by, for example, wet spinning and coagulation. Before this PAN precursor is transformed to carbon fibers under high temperatures, it is usually subjected to oxidative cyclizing (also referred to as oxidation, in short) in an oxygen-containing atmosphere at elevated temperatures of about 180 to 300° C. The resulting chemical cross-linking improves the dimensional stability of the fibers. Subsequently, at temperatures of at least 1200° C., the actual pyrolysis to carbon fibers is performed. Depending on the shape of the desired fiber material, either the initial fibers or an already flat fiber material can be used for this pyrolysis. Depending on the temperature of the pyrolysis, a distinction is made between carbonizing and graphitizing. Carbonizing is a treatment at about 1200 to 1500° C. under an inert gas atmosphere leading to volatile products being released. Graphitizing, i. e., heating to about 2000 to 3000° C. under an inert gas achieves so-called high-modulus or graphite fibers. These fibers have high purity, light weight, high strength and excellent conductivity of electricity and heat.

The fiber material a) is preferably selected from carbon fiber fabrics, carbon fiber papers and carbon fiber nonwoven fabrics.

With carbon fiber fabrics, the flat fiber material is produced by crossing two thread systems, warp (warp threads) and weft (weft threads). As in textiles, fiber bundles are flexibly but inseparably joined. For the production of carbon fiber fabrics, preferably oxidized, but not yet carbonized or graphitized PAN fibers are used. Carbonizing or graphitizing to provide the flat fiber material with electrical conductivity, is performed after weaving.

As initially described, oxidized PAN fibers are commonly used for the production of carbon fiber papers. These are broken into fiber fragments, suspended in water and, in an analogous fashion to paper making, a fiber laying (a sheet formed of slurry) is produced by screening and dried. In a preferred embodiment, at least one binder is additionally introduced into the paper. Suitable binders are, for example, phenolic, furan, polyimide resins, etc. To introduce the binder, the paper can be impregnated therewith, and, as the case may be, the binder can be subsequently cured. After impregnating and curing, the carbon fiber paper is subjected to another carbonizing/graphitizing process, to also convert the binder to compounds having improved electrical conductivity. In a further suitable embodiment, to provide the fiber material a) a filled carbon fiber paper is used. The production is at first like the one described above, but instead of introducing the binder and carbonizing/graphitizing it, a filler of a carbon material in a polymeric binder is introduced into the still-wet paper. In particular, a carbon-PTFE filler is used. By this filling, the thermal and electrical conductivity is sufficiently increased so that carbonizing/graphitizing can be omitted.

To produce carbon fiber nonwoven fabrics non-oxidized or oxidized PAN fibers may be used. In a first step, they can be laid (carded) in a dry state to form a card nap and subsequently consolidated to form a nonwoven fabric. This can be done, for example, by hydro-entangling wherein the carbon fibers are oriented, crossed and thus mechanically stabilized. As the case may be, the thickness of the consolidated nonwoven fabric can be calibrated to a desired value. In the case of nonwoven fabrics on the basis of non-oxidized PAN fibers, after laying the nonwoven fabric and consolidating, they are oxidized at an elevated temperature and under an oxygen atmosphere and subsequently carbonized/graphitized under an inert gas atmosphere. Nonwoven fabrics on the basis of oxidized PAN fibers are only subjected to carbonizing/graphitizing after laying and consolidating the nonwoven. Optionally, at least one binder can be introduced into the nonwoven fabric, which can be subsequently cured. Suitable binders are especially phenolic resins, as mentioned with reference to carbon fiber papers. The introduction of the binder can be subsequent to, for example, carbonizing/graphitizing, and the resulting impregnated nonwoven fabric can be finally carbonized/graphitized again.

In a special embodiment, the flat, electrically conductive fiber material a) comprises at least one carbon fiber nonwoven fabric. They are advantageous, among other things, since they are compression elastic and can be simply manufactured on an industrial scale, for example, in a roll-to-roll process.

The fiber material a) is usually a fiber composite material, comprising:
    a1) carbon fibers,
    a2) as the case may be, at least one polymeric binder and/or a pyrolysis product thereof,
    a3) as the case may be, at least one further additive different from a2).

The fiber materials a) contained in the gas diffusion layer can contain common additives a3). They are preferably selected from hydrophobizing agents, conductivity-enhancing additives, surfactants and mixtures thereof.

To improve the transport processes through the GDL and at the interfaces, it may be advantageous to increase the hydrophobicity of the fiber material a). Suitable hydrophobicity-enhancers are fluorine-containing polymers, such as polytetrafluoroethylene (PTFE) and tetrafluoroethylene hexafluoropropylene copolymers (FEP). Preferably, PTFE is used as the hydrophobicity enhancer. The fiber material can be finished by the usual impregnating processes with the hydrophobicity enhancer. To do this, a PTFE dispersion can be applied in a dip bath, the solvent can be evaporated, and the treated fiber material can be sintered at elevated temperatures of usually at least 300° C.

Preferably, the fiber material a) has a hydrophobicity enhancer content of 3 to 40 wt % in relation to the overall weight of the fiber material a). In a special embodiment, the fiber material has a PTFE content of 3 to 40 wt % in relation to the overall weight of the fiber material a).

To improve the electrical and thermal conductivity, the fiber material a) can be finished with at least one conductivity-enhancing additive. Suitable conductivity-enhancing additives are, for example, metal particles, carbon particles, etc. Preferably, the conductivity-enhancing additive is selected from carbon black, graphite, graphene, carbon nano tubes (CNT), carbon nano fibers and mixtures thereof. The finishing of the fiber material a) with at least one conductivity-enhancing additive can be performed, for example, together with the hydrophobicity enhancer, especially a PTFE dispersion. Often the fiber material a) has good electrical and thermal conductivity due to the carbon fibers used even without the use of conductivity-enhancing additives.

Preferably, the fiber material a) has a conductivity-enhancing additive content of 0 to 40 wt % in relation to the overall weight of the fiber material a). When the fiber material a) contains a conductivity-enhancing additive, it is preferably present in an amount of 0.1 to 40 wt %, particularly preferably of 0.5 to 30 wt %, in relation to the overall weight of the fiber material a).

The fiber material a) preferably has a thickness in the range of 50 to 500 µm, particularly preferably from 100 to 400 µm. This thickness relates to an uncompressed state of the fiber material a), i. e., prior to installation of the GDL in a fuel cell.

The fiber material a) preferably has a porosity in the range of 10 to 90%, particularly preferably from 20 to 85%. When the fiber density is known, the porosity of the fiber material can be computed from the measured thickness of the measured weight per unit area. Thus, for a carbon fiber density of 1.8 g/cm$^3$: porosity [%]=[(1.8 weight per unit area)/1.8]×100. Furthermore, there is a possibility of determining the density of the gas diffusion layer via a helium density measurement and determining the specific pore volume via mercury porosimetry. The porosity is then computed as follows: porosity [%]=specific pore volume/(specific pore volume+1/He density)×100%].

The mean pore diameter of the fiber material a) is preferably in a range of 5 to 60 µm, particularly preferably from 8 to 50 µm, in particular from 10 to 40 µm. The mean pore diameter can be determined via mercury porosimetry.

The gas diffusion layer according to the invention consists of a two-layer laminate composite on the basis of a flat, electrically conductive fiber material a) and a microporous layer (MPL) b) on one of the surfaces of the fiber material a).

In contrast to the macro-porous fiber material a), the MPL is microporous, having pore diameters usually substantially below one micrometer, preferably of at most 90 nm, particularly preferably of at most 500 nm, in particular of at most 300 nm. The mean pore diameter of the MPL b) is preferably in the range of 5 to 200 nm, particularly preferably from 10 to 100 nm. The mean pore diameter is determined, again, via mercury porosimetry. The latter mean pore diameters are applicable, in particular, to the use of carbon black as conductive particles in the MPL. Substantially larger MPL pores can be created by the use of graphite as conductive particles in the MPL or the use of pore promoters. Depending on the composition, the mean pore diameter will be larger than, for example, 1 µm. When various conductive particles are used, the pore diameter can have a bimodal or polymodal distribution curve. The use of a mixture of carbon black and graphite can thus create a distribution of the pore diameter with two pore peaks (one carbon-black peak and one graphite peak).

The MPL contains conductive carbon particles, preferably carbon black or graphite, in a matrix of a polymeric binder. Preferred binders are the above-mentioned fluorine-containing polymers, especially polytetrafluoroethylene (PTFE).

The microporous layer b) preferably has a thickness in the range of 10 to 100 µm, particularly preferably from 20 to 50 µm. This thickness relates to the uncompressed state of the microporous layer b), i. e., prior to installation of the GDL in a fuel cell.

The presence of the MPL has a substantial influence on the water household of the fuel cell. Due to the high PTFE content and the smaller pores of the MPL, flooding of the GDL and the electrode is impeded by the MPL acting as a liquid barrier and thus promoting the material transport of the gaseous reactants on the catalyst. It has been shown that it can be advantageous when, in the gas diffusion layer of the present invention, the microporous layer has a property gradient regarding its base area (in the xy plane) of the GDL.

The gas diffusion layer of the present invention preferably has a thickness (overall thickness of fiber material a) and MPL b)) in the range of 80 to 1000 µm, particularly preferably from 100 to 500 µm. This thickness relates to the uncompressed state of the GDL, i. e., prior to installation in a fuel cell.

Furthermore, the gas diffusion layers preferably have a high overall porosity. This is preferably in the range of 20% to 80%, which is determined, as described before, by helium density measurement and mercury porosimetry.

Property Gradient

As mentioned above, both the flat fiber material a) and the microporous layer b), as well as both of these can have at least one property gradient.

The property having the gradient can be selected, in principle, among the chemical composition of the flat fiber material a) and/or the microporous layer b), the mechanical properties of the flat fiber material a) and/or the microporous layer b), the transport properties of the flat fiber material a) and/or the microporous layer b), combinations thereof.

The chemical properties of the flat fiber material a) and/or the microporous layer b), which can have a gradient, include, for example, the content of hydrophobicity enhancer, carbon particles, etc. This includes, in particular, the content of PTFE, carbon black, graphite, graphene, carbon nano tubes (CNT), carbon nano fibers and mixtures thereof.

The mechanical properties of the flat fiber material a) and/or the microporous layer b), which can have a gradient, include, for example, the density, the mass per unit area, the porosity and the mean pore diameter.

The density in g/m$^3$ can be determined, as described above, by means of helium density measurement.

The mass per unit area in g/m$^2$ can be determined in accordance with ISO 9073-1 or EN 29073-1:1992.

The porosity of the GDL can be determined by various well-known measuring methods, such as mercury porosimetry or the nitrogen BET method.

To create a gradient in the mechanical properties, the compression behavior of the microporous layer can be provided with a gradient, for example, by varying the composition regarding at least one of its materials. This also changes the bond with the electrode. Alternatively, a gradient in the mechanical properties can be created by providing a gradient across the material width during nonwoven fabric consolidation by means of water jets. This influences the mechanical properties and the water transport.

The transport properties of the flat fiber material a) and/or the microporous layer b), which can have a gradient, include:

the gas permeability of the flat fiber material a) and/or the microporous layer b), the liquid permeability of the flat fiber material a) and/or the microporous layer b), the electrical transport resistance of the gas diffusion layer through the material plane, the thermal transport resistance of the gas diffusion layer through the material plane, the dry diffusion length.

The through-plane gas permeability can be determined by means of a Gurley measurement, for which an automated Gurley densometer of Gurley Precision Instruments can be used. For the measurement, the time in seconds is determined until 100 cm$^3$ air has flowed at a constant pressure differential perpendicular through the GDL specimen with a flow-through specimen area of 6.42 cm$^2$. The determination of the Gurley air permeability is described in ISO 5636-5.

Measurement of the gas permeability in 1/m$^2$ can also be performed in accordance with DIN EN ISO 9237:1995-12 for determining the air permeability of textile sheet materials.

The permeability for liquids, in particular liquid water, perpendicular to the material plane (liquid water permeability "through-plane") can be determined with the aid of a so-called "filtration cell" or in accordance with the "Penn State" method [cf. cited literature a-c]: [a] I. S. Hussaini and C. Y. Wang, "Measurement of relative permeability of fuel cell diffusion media," Journal of Power Sources, vol. 195, pp. 3830-3840, 2010; [b] J. D. Sole, "Investigation of water transport parameters and processes in the gas diffusion layer of PEMFCs," Virginia Polytechnic Institute, 2008; [c] J. Benziger, J. Nehlsen, D. Blackwell, T. Brennan, and J. Itescu, "Water flow in the gas diffusion layer of PEM fuel cells," Journal of Membrane Science, vol. 261, pp. 98-106, 2005.

A method known in the literature bearing the name quasi-four-point measurement can be used for determining the electric resistivity through the plane (through-plane, TP). Separate sensing of the volume resistivity of the MPL is not possible with this method.

To determine the thermal resistance through the plane (through-plane, TP), two well-known testing methods, the heat-flow method or the laser-flash method, can be used.

The dry diffusion length is the actual length of the distance which a gas molecule travels through the flat fiber material a) and/or the microporous layer b) in μm. It is determined by means of a stationary Wicke-Kallenbach cell.

In a preferred embodiment, the microporous layer (MPL) includes at least one property gradient with respect to at least one chemical and/or physical property. The MPL has the at least one property gradient regarding its base area, i. e., in the plan view, or in the xy plane. As the case may be, the MPL can have an additional property gradient perpendicular to the base plane, i. e., in the direction of the z axis.

Preferably, the microporous layer has at least 2, more preferably at least 3, in particular at least 4, especially at least 5, more especially at least 6 discrete regions, which differ in at least one property. In this embodiment, the variation in property is step-wise between regions. The individual regions can differ from each other regarding the same property or (when there are a plurality of different properties) regarding the same properties.

This is preferred. However, it is also possible for two or more regions to differ regarding different properties. In a special embodiment, the microporous layer has at least 2, preferably at least 3, in particular at least 4, especially at least 5, more especially at least 6 discrete regions, which all differ regarding one-and-the-same property.

In a special embodiment, each individual region is essentially homogeneous regarding its properties. Essentially homogeneous is understood to mean that only those property variations occur within one region which occur (e. g. due to manufacturing processes) even when a gradient is not specifically intended.

In an alternative embodiment, the microporous layer has at least one continuous property gradient.

Preferably, the microporous layer has at least 2, more preferably at least 3, in particular at least 4, laterally adjacent strips, which differ in at least one property. In a special embodiment, the microporous layer has at least 2, preferably at least 3, in particular at least 4, laterally adjacent strips, which all differ regarding one-and-the-same property. Especially, each individual strip is essentially homogeneous with respect to its properties.

Preferably, the property of the microporous layer, which includes a gradient, is selected among:
the Gurley gas permeability, and
the dry diffusion length.

A Method for Producing a Gas Diffusion Layer

A further subject matter of the invention is a method for producing a gas diffusion layer for a fuel cell, comprising a flat, electrically conductive fiber material a) and/or a microporous layer b) on one of the surfaces of the fiber material, wherein the microporous layer, with respect to the base area (in the xy plane) of the gas diffusion layer, includes at least one property gradient relating to at least one chemical and/or physical property, including
i) providing a flat, electrically conductive fiber material a),
ii) coating the fiber material provided in step i) with a precursor for forming a microporous layer, wherein the composition of the precursor is varied during coating to produce a gradient,
iii) thermally post-processing the coated fiber material obtained in step ii).

Regarding the fiber materials a) which are used in and which are suitable and preferred for step i), reference is made to the above explanations in full.

The precursors used in step ii) preferably contain at least one fluorine-containing polymer, at least carbon material and, as the case may be, at least one pore promoter. The fluorine-containing polymers are preferably selected from polytetrafluoroethylene (PTFE) and tetrafluoroethylene hexafluoropropylene copolymers (FEP). Preferably, PTFE is used. Preferably, the carbon material is selected from carbon black, graphite, graphene, carbon nano tubes (CNT), carbon nano fibers and mixtures thereof. Preferably, carbon black or graphite is used. In a special embodiment, the precursors used in step b) preferably contain at least one pore promoter. Suitable pore promoters are commercially available plastic particles, e. g. of polymethylmethacrylate (PMMA). A suitable particle size is in the range of 10 to 100 μm.

Preferably, the volume content of the pores in the finished microporous layer, which is due to the use of a pore promoter, is 0 to 70 vol. % in relation to the overall volume of pores in the finished microporous layer.

Preferably, the fiber material a) is coated with at least 2, preferably at least 3, in particular at least 4, laterally adjacent strips of precursors of different composition for forming the microporous layer. The application of the MPL can be performed in different ways. While spraying, screen-printing or Meyer-Rod methods are often used in discontinuous manufacture, doctor-blade, slot-nozzle and gravure roll-coating processes are used on continuous coating. The MPL layer thickness and the penetration depth can be influenced by the coating process parameters and the viscosity of the coating. Finally, there is another thermal treatment, e. g. in a drying and sintering furnace. This can be done by first drying at a temperature of 100 to 200° C. and subsequently sintering at a temperature of 300 to 500° C.

Fuel Cell

A further subject matter of the present invention is a fuel cell, comprising at least one gas diffusion layer as defined above and obtainable by a method as defined above.

In principle, the gas diffusion layer according to the invention is suitable for all the usual types of fuel cells, in particular low-temperature proton exchange membrane fuel cells (PEMFC). Reference is made to the above explanations regarding the structure of fuel cells in full.

It is an advantage of the present invention that the transport processes through the gas diffusion layer can be specifically adjusted to the gradients of the operating media flowing through the fuel cell and/or the operating parameters of the fuel cell. To do this, usually at least one property gradient of the gas diffusion layer corresponds to at least one of the property gradients of the operating media flowing through the fuel cell and/or the operating parameters of the fuel cell.

The following examples are given for the purpose of explanation of the invention without restricting it in any way.

EXAMPLES

Example 1

Production of a Gas Diffusion Layer Having a Property Gradient in the X Direction.

From a commercially available electrically conductive fiber nonwoven fabric having a thickness of 0.145 mm, a weight per unit area of 60 g/cm² and a volume resistivity (through-plane) at 1 MPa pressure of 6.6 mΩcm², sheets in A3 format (29.7×42 cm) were stamped out in the longitudinal direction (machine direction, md) from the GDL roll and individually coated. To create a microporous layer having a property gradient, laterally adjacent strips of MPL pastes in widths of 7 to 8 cm each were applied in the longitudinal direction of the fiber nonwoven fabric 4 (see FIG. 1). The pastes had a composition in accordance with table 1. For manufacture, PTFE, various carbons and plastic particles as pore promoters were dispersed in distilled water and applied to the fiber nonwoven fabric by means of doctor blades. Subsequently, the sheets were dried at 160° C. and sintered at 400° C. The resulting MPL loads were, depending on the strip, 15 to 22 g/m².

TABLE 1

| | PTFE [wt %][1] | carbon [wt %][1] | pore promoter [wt %][1] | solid percentage [wt %][1] |
|---|---|---|---|---|
| Paste 1 | 2.3 | 9.3 | 0 | 11.6 |
| Paste 2 | 1.9 | 7.7 | 0.2 | 9.8 |
| Paste 3 | 2.1 | 8.3 | 0.4 | 10.8 |
| Paste 4 | 2.1 | 8.4 | 0.4 | 10.9 |

[1]each in relation to the overall weight of the paste

From the resulting sheets, gas diffusion layers were stamped out in the format 274.8×96.5 mm with the long side transverse to the machine direction. FIG. 1 shows three alternative stamping positions. The GDLs obtained have a property gradient in the direction of the x axis, GLD 1 having four strips each having different properties, and GDL 2 and 3 each having three strips each having different properties.

To produce a fuel cell, as described in the following, the GDLs are installed in such a manner that the x direction (long side) extends along the direction of the direct connection between the inlet and the outlet of the operating media with respect to the flow distribution plate. In a flow distribution plate having straight channels, the long side of the GDL is therefore parallel to the gas channels. However, in another flow field design, on the cathode side (air side) of the fuel cell, the supplied, O₂-rich fuel comes into contact first with the MPL formed by paste 1, and the exhausted, O₂-depleted fuel comes into contact with the MPL formed by paste 4.

In the GDL 1 according to FIG. 1, for each of the four strips, the Gurley gas permeability perpendicular to the material plane was determined with the aid of a Gurley densometer of Gurley Precision Instruments in accordance with ISO 5636-5. The results can be derived from Table 2.

In the GDL according to FIG. 1, for each of the four strips, the dry diffusion length was also determined with the aid of a stationary Wicke-Kallenbach cell. The results can also be derived from Table 2.

TABLE 2

| Strips of | dry diffusion length [μm] | air permeability (Gurley) [s] |
|---|---|---|
| Paste 1 | 747 | 23.6 |
| Paste 2 | 607 | 4.2 |
| Paste 3 | 560 | 2.0 |
| Paste 4 | 522 | 1.6 |

Example 2

Measurement of the Current Density Distribution

For an in-situ measurement of the current density distribution, on the one hand a membrane-electrode assembly (MEA) according to the invention was used, the cathode of which was based on a gas diffusion layer (GDL), the microporous layer (MPL) of which had a property gradient in the longitudinal direction of the fiber nonwoven fabric of four laterally adjacent strips (GDL 1 of example 1). As an anode, a conventional GDL was used, the MPL of which had no property gradient. To manufacture the latter, MPL paste 4 of example 1 was used. For purposes of comparison, an MEA was taken the anode and cathode of which had a GDL not according to the present invention (without property gradient) in analogy to the anode of the MEA according to the invention.

In a test system, the MEA was supplied with hydrogen and oxygen each at a pressure of 1.5 bar, the relative moisture (RH) of both gases prior to entry into the measuring arrangement, was 95% respectively and the operating temperature of the fuel cell was 74° C. (coolant temperature at the outlet of the cathode). The excessive hydrogen supply $\lambda_A$ was 1.2, the amount of excessive O₂ $\lambda_C$ was 2.0. The current density distribution was determined at the cathode at a mean value of tapped current density of 1.8 A/cm² using a matrix of measuring points, which had 22 measuring locations in the course of the flow in the main flow direction of the gases between the cathode inlet and the cathode outlet, and 9 measuring locations perpendicular to the main flow direction of the gases (i. e., 198 measuring points overall).

Figure 2:
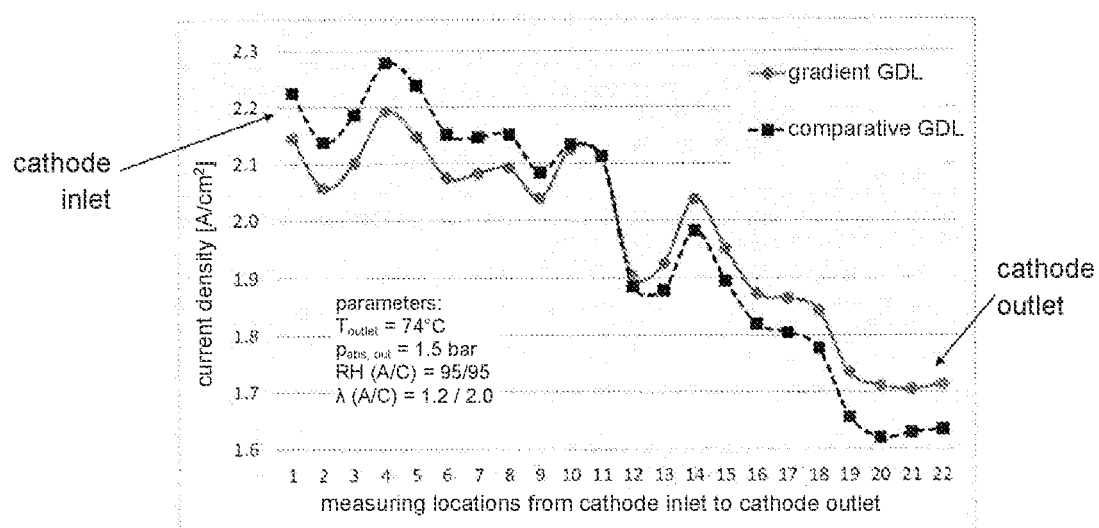
FIG. 2 shows the current density distribution at the cathode determined in accordance with example 2, of a membrane-electrode assembly according to the present invention, comprising an MPL including a property gradient (circles), and a membrane-electrode assembly not according to the present invention without a property gradient (squares).

FIG. 2 shows the determined current density distributions at the cathode of the MEA according to the present invention (curve having circular symbols) and not according to the invention (curve having square symbols). The curves show the means values across the 9 measuring locations perpendicular to the main flow direction of the gas for each measuring location 1 to 22 in the main flow direction of the gas. It can be shown that the GDL of the present invention has a more uniform current density distribution than the comparative GDL.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A gas diffusion layer for a fuel cell, comprising:
a) a flat, electrically conductive fiber material; and
b) a microporous layer on one surface of the fiber material,
wherein the gas diffusion layer has, with respect to a base area thereof (in an xy plane), at least one property gradient relating to at least one chemical and/or physical property,
wherein the microporous layer has at least one property gradient,
wherein the gas diffusion layer has an overall porosity of 20% to 80%, and
wherein a volume fraction of pores in the microporous layer attributable to a pore promoter is 0 to 70 volume percent in relation to a total volume of the pores in the microporous layer.

2. The gas diffusion layer of claim 1, wherein the microporous layer includes a continuous or discontinuous property gradient monotonically varying as a function of a location thereof.

3. The gas diffusion layer of claim 1, wherein the microporous layer includes at least two regions differing in at least one property.

4. The gas diffusion layer of claim 1, wherein the microporous layer includes at least two laterally adjacent strips differing in at least one property.

5. The gas diffusion layer of claim 4, wherein each individual strip is essentially homogeneous regarding properties thereof.

6. The gas diffusion layer of claim 1, wherein the at least one chemical and/or physical property including a gradient comprises:
a chemical composition of the flat fiber material a) and/or the microporous layer b), mechanical properties of the flat fiber material a) and/or the microporous layer b), transport properties of the flat fiber material a) and/or the microporous layer b), and/or combinations thereof.

7. A fuel cell, comprising:
at least one gas diffusion layer of claim 1.

8. The fuel cell of claim 7, wherein the at least one property gradient of the gas diffusion layer corresponds with at least one property gradient of an operating media flowing through the fuel cell and/or operating parameters of the fuel cell.

9. A method for producing fuel cells having reduced variation of a current density across electrode surfaces, comprising:
using the gas diffusion layer of claim 1.

10. The gas diffusion layer of claim 1, wherein the microporous layer includes at least three regions differing in at least one property.

11. The gas diffusion layer of claim 1, wherein the microporous layer includes at least four regions differing in at least one property.

12. The gas diffusion layer of claim 1, wherein the microporous layer includes at least three laterally adjacent strips differing in at least one property.

13. The gas diffusion layer of claim 1, wherein the microporous layer includes at least four laterally adjacent strips differing in at least one property.

14. A method for producing a gas diffusion layer for a fuel cell, comprising a flat, electrically conductive fiber material and a microporous layer on one surface of the fiber material, the microporous layer, with respect to a base area thereof (in an xy plane) of the gas diffusion layer, including at least one property gradient relating to at least one chemical and/or physical property, the method comprising:
i) providing the flat, electrically conductive fiber material;
ii) coating the fiber material provided in step i) with a precursor for forming the microporous layer, a composition of the precursor being varied during coating to produce a gradient so as to provide a coated fiber material; and
iii) thermally post-processing the coated fiber material obtained in step ii).

15. The method of claim 14, wherein the composition of the precursor is varied during coating such that the microporous layer, with respect to the base area (in the xy plane) of the gas diffusion layer, includes at least one monotonic property gradient.

16. The method of claim 14, wherein the precursor used in step ii) comprises at least one fluorine-containing polymer and at least one carbon material.

17. The method of claim 14, wherein the fiber material is coated with at least two laterally adjacent strips of the precursor for forming the microporous layer.

18. The method of claim 14, wherein the precursor used in step ii) comprises at least one pore promoter.

19. A fuel cell, comprising:
at least one gas diffusion layer obtained by the method of claim 14.

* * * * *